Figure 3:
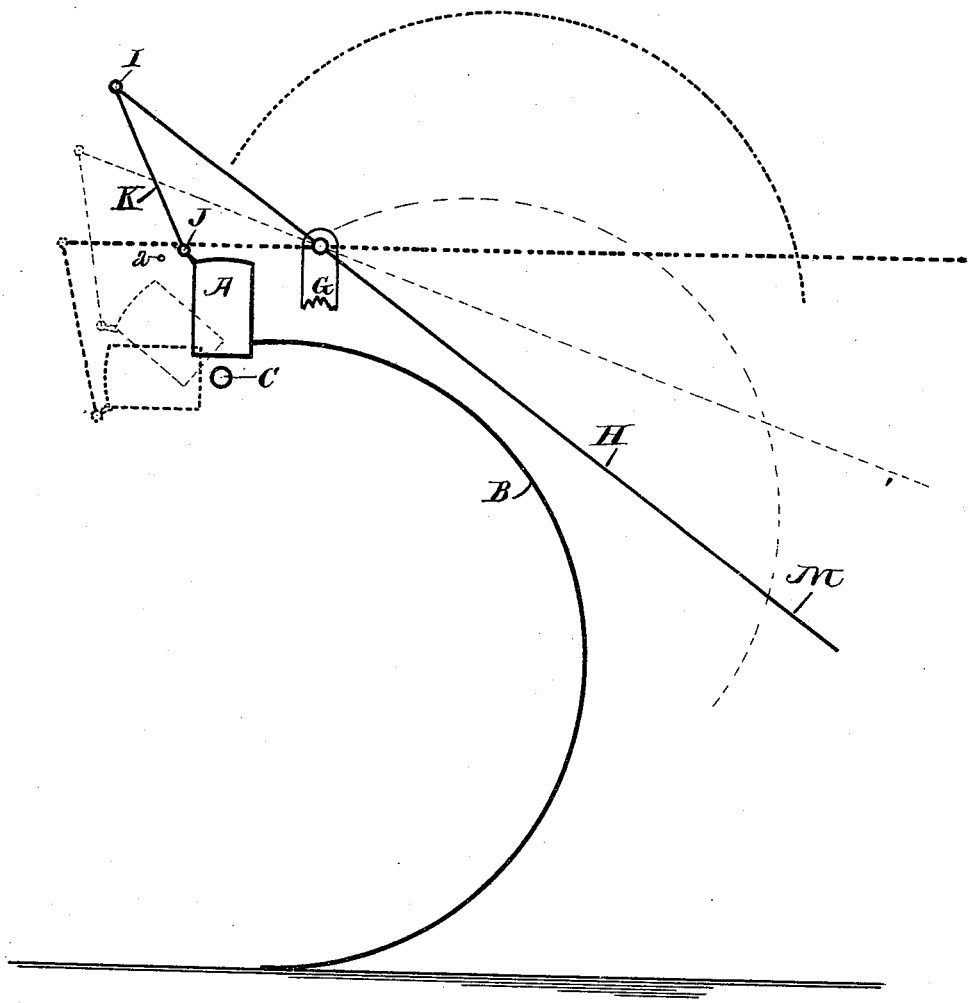

(No Model.)
2 Sheets—Sheet 1.
J. M. LONG.
HORSE HAY RAKE.
No. 329,917.       Patented Nov. 10, 1885.
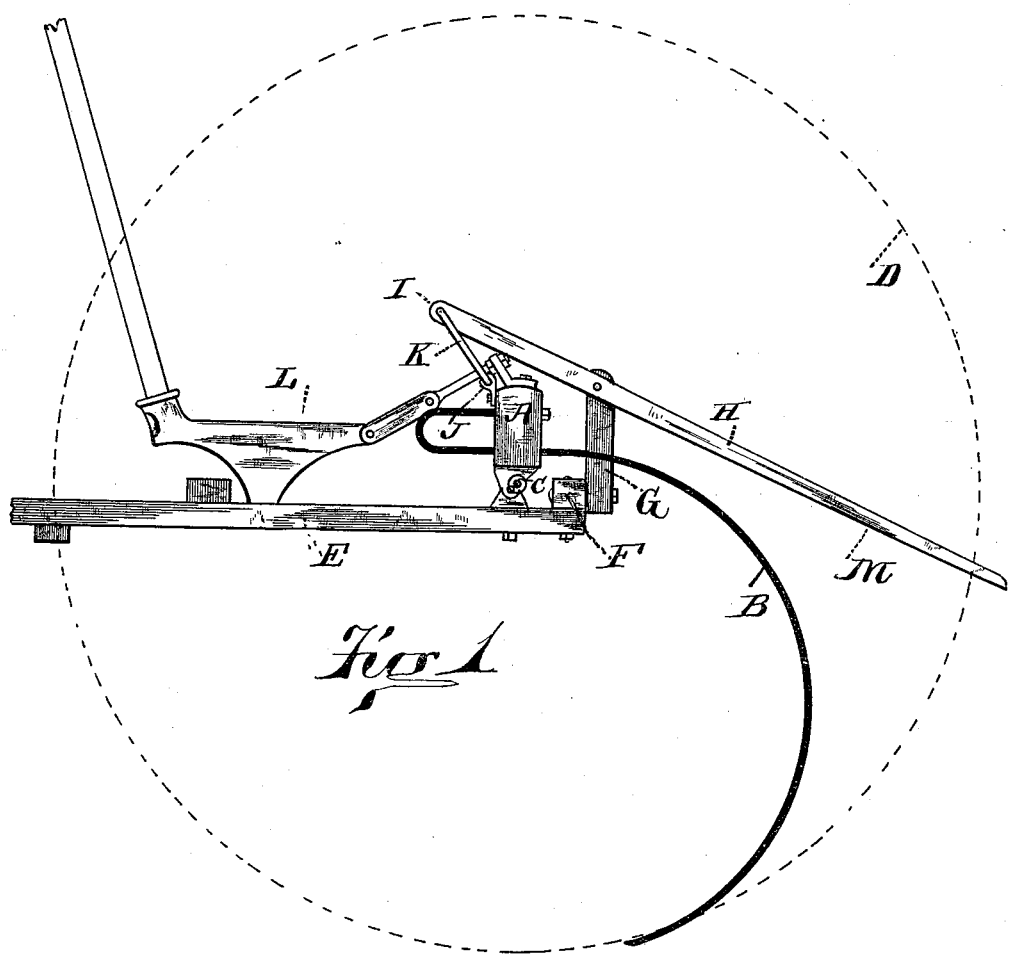
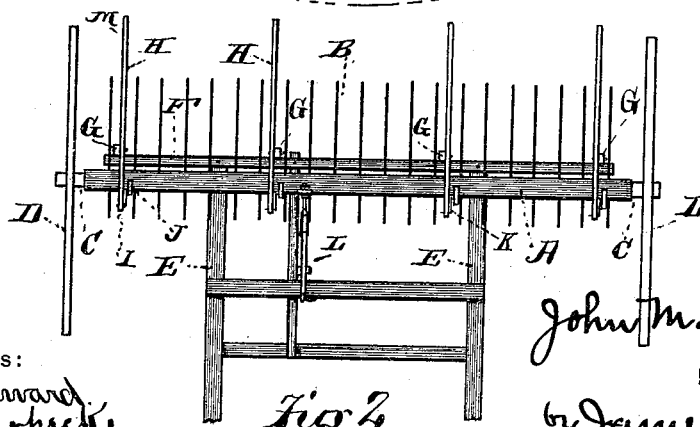
Witnesses:
Inventor
John M. Long
by James W. See
Attorney (No Model.)
2 Sheets—Sheet 2.

J. M. LONG.
HORSE HAY RAKE.

No. 329,917. Patented Nov. 10, 1885.

Witnesses:
W. A. Serrard
W. T. Coleman

John M. Long
by James W. See
Inventor
Attorney

UNITED STATES PATENT OFFICE.

JOHN M. LONG, OF HAMILTON, OHIO.

HORSE HAY-RAKE.

SPECIFICATION forming part of Letters Patent No. 329,917, dated November 10, 1885.

Application filed December 15, 1884. Serial No. 150,359. (No model.)

*To all whom it may concern:*

Be it known that I, JOHN M. LONG, of Hamilton, Butler county, Ohio, have invented certain new and useful Improvements in Horse Hay-Rakes, of which the following is a specification.

This invention pertains to horse hay-rakes, and it relates to the arrangement of cleaning devices, as will be understood from the following description, taken in connection with the accompanying drawings, in which—

Figure 1 is an end view of a horse hay-rake illustrating my improvements, the wheels being omitted; and Fig. 2, a plan of the machine upon a somewhat smaller scale. Fig. 3 is an elemental diagram upon an enlarged scale, illustrating the motions of the most important parts.

In my improvement I employ oscillating pivoted cleaning-levers, which operate between the teeth when the rake is dumped, the levers being operated by the rocking head of the rake as the rake is dumped.

In the drawings, A represents the rake-head, arranged to rock as usual; B, the flexible rake-teeth secured to the rake-head; C, the wheel-axles secured to the rake-head; D, the wheels; E, the shafts or front framing of the rake, hinged, as usual, to the rake-head, so as not to interfere with the rocking of the rake-head; F, a frame-bar to the rear of and parallel with the rake-head, and secured to rearward projections of the shafts or frame-pieces; G, pivot-supports, four in number in the illustration, projecting upward from the frame-bar; H, cleaning-levers pivoted to the pivot-supports; I, the forward ends of the cleaning-levers projecting over and in front of the rake-head; J, link-eyes attached to the rake-head under the forward ends of the cleaning-levers; K, links connecting the forward ends of the cleaning-levers with the link-eyes; L, the usual lever mechanism by which the rake-head is rocked when the rake is to be dumped, and M the rear portion of the cleaning-levers.

The usual driver's seat should be provided.

The rake is dumped as usual, the lever mechanism L serving to rock the rake-head forward upon the wheel-centers as an axis, and to elevate the rake-teeth and to drop the load. The cleaning-levers normally stand above the rake-teeth, as shown.

The cleaning-levers, when the teeth are in raking position, occupy a position angularly above the teeth, as indicated in Fig. 3.

As the rake-teeth rise when the rake is dumped, the cleaning-levers operate between the rake-teeth and serve in clearing the load; but toward the end of the rising dumping motion of the teeth the cleaning-levers rise so as to clear the windrow, as indicated by the heavy dotted lines in Fig. 3.

I claim as my invention—

The combination of a rocking rake-head provided with a rank of teeth, pivoted cleaning-levers disposed over the teeth and adapted to oscillate so as to enter between the teeth, and mechanism, substantially as set forth, connecting the rake-head with the cleaning-levers and adapted to oscillate them as the rake-head is rocked for dumping the load, substantially as and for the purpose set forth.

JOHN M. LONG.

Witnesses:
J. W. SEE.
W. A. SEWARD.